United States Patent

[11] 3,622,371

| [72] | Inventor | Clayton R. Sparks<br>Pittsburg, Kans. |
|---|---|---|
| [21] | Appl. No. | 762,610 |
| [22] | Filed | Sept. 25, 1968 |
| [45] | Patented | Nov. 23, 1971 |
| [73] | Assignee | Gulf Oil Corporation<br>Pittsburgh, Pa. |

[54] REINFORCEMENT OF STRUCTURES WITH COATINGS OF GLASS FIBERS AND RESIN
3 Claims, No Drawings

[52] U.S. Cl.................................................. 117/49,
117/126 GE, 117/126 GM, 117/132 BE, 117/161, 156/94, 161/93
[51] Int. Cl..................................................... C23f 15/00, B44d 1/34
[50] Field of Search........................................... 161/93, 151, 156, 185; 156/94, 95; 117/49, 126, 128.4, 161

[56]     References Cited
    UNITED STATES PATENTS

| 2,795,523 | 6/1957 | Cobb et al. ................ | 161/39 |
|---|---|---|---|
| 2,825,659 | 3/1958 | Dalton et al. ............... | 117/126 |
| 3,375,263 | 3/1968 | Trebilcock ................. | 117/126 X |
| 3,470,048 | 9/1969 | Jones........................ | 156/94 |

*Primary Examiner*—Ralph S. Kendall
*Assistant Examiner*—Edward G. Whitby
*Attorneys*—Richard L. Kelly, Carl A. Cline, Forrest D. Stine and Richard A. Anderson

ABSTRACT: Industrial equipment such as tanks, rotating drum granulators and driers, prilling towers and metal storage bins are lined with a glass fiber reinforced resin coating bonded to a surface which has been sandblasted in an overall pattern covering less than one-third of the total area. The combination of pattern sandblasting with high adhesion and ductility of the resin coating reduces sandblasting costs and increases resistance of the structure to vibration and bending stresses.

REINFORCEMENT OF STRUCTURES WITH COATINGS OF GLASS FIBERS AND RESIN

DESCRIPTION OF THE INVENTION

Industrial buildings, tanks and other metal structures which are subjected to corrosive environmental conditions are frequently given protective coatings of resins or other organic materials so as to prolong the service life of the equipment. In the case of structures which have become corroded or damaged, the customary procedure is to clean the entire surface to be protected by sandblasting or other abrasive technique, and apply a fairly thick adherent coating of a thermosetting resin containing chopped glass fibers for reinforcement. This technique not only protects the underlying surface from further deterioration, but restores the physical strength of the structure.

The conventional method of coating with glass fiber reinforced resin has certain disadvantages, however. Exposure of fresh metal or other structural material by sandblasting the entire surface is difficult and expensive, so that in many instances replacement is cheaper than reinforcement. The hard, reinforced resin coatings in general use often cause a change in the pattern of stresses in the structure from that originally planned by the engineer, resulting in unexpected cracking and failure of the underlying metal structure. Often these failures are concealed by the coating so that the weakness is not detected until a rupture occurs. Furthermore, the hard, stiff resin coatings are often cracked or crazed in localized areas by denting of the underlying structure. I have discovered that it is not necessary to subject more than a third of the surface to abrasive cleaning prior to coating and that ductility of the reinforced resin is preferable to the hardness which has been sought in the past for the purpose of dimensional stability. In fact, my experience has shown that extreme dimensional stability of the resin coating combined with unyielding adhesion of the entire surface of the structure is actually undesirable, as it results in concentration of stresses in unexpected places, causing frequent failures in the underlying metal structure.

Briefly, my method of reinforcement comprises the following steps:

a. abrading the surface of the structure to be reinforced in a substantially uniform pattern which exposes underlying material over less than one-third of the total surface area, b. coating the entire surface area to be reinforced with an adhesive thermosetting resin containing discontinuous glass fibers and c. curing the coating of adhesive thermosetting resin and glass fibers to yield a hard, adherent coating which is dimensionally stable but may be deformed substantially without cracking.

The method is described in detail in the following discussion.

ABRADING THE SURFACE

The purpose of abrading the surface is to expose the underlying material of construction so as to obtain a firm adhesive bond. Ordinarily it is necessary to remove rust, paint, corrosion, grease or dirt to expose fresh metal. Abrading is preferable to scraping, as this method has been found to give adhesive bonds of better shear and peel strength.

The preferred method of surface preparation is sandblasting in a geometrical pattern over the entire surface. The most convenient pattern is a plaid or checked pattern of crossed lines along which the sandblasting nozzle is moved. A pattern of longitudinal zigzag lines, similar to a herringbone pattern is also suitable. Discontinuous patterns such as patterns of dots, circles or crosses are satisfactory, but require more labor to make and are therefore not preferred.

Some areas of older equipment may be badly rusted or corroded. If the sandblasting pattern exposes bare metal in these areas, adhesion will be adequate and it is unnecessary to clean off the entire area. It may be disadvantageous to clean off completely all of the badly corroded areas, as these will be subjected to uneven distribution of stresses under load and distortion of the structure may result. A better practice is to sandblast this surface in the same pattern as the rest, but increase the thickness of the coating to compensate for the weakness of the corroded area.

COATING THE SURFACE

The preferred method of coating is to use a spray gun with multiple spray nozzles for liquid resin, plus a chopper which cuts off lengths of glass fiber roving and blows it into the liquid spray streams. Preferably the glass fiber stream should be aimed at the zone of intersection of multiple resin spray streams, so as to assure wetting of glass fibers and retention in the coating. This method of spray application is now commonly used in manufacturing boats. More recent designs of spray guns may have as many as four separate liquid spray nozzles as disclosed, for example in U.S. Pat. No. 3,212,717 of Scheinert. Other spray gun-fiber chopper arrangements are disclosed, for example, in U.S. Pat. Nos. 3,123,307 and 3,130,913.

A preferred liquid resin for use in the coating is a coal tar-modified epoxy resin of the type disclosed in U.S. Pat. No. 2,980,601. The curing agent is mixed with the curable polyepoxide resin and sprayed as a single-liquid composition. Because the curing process begins shortly after mixing, the mixed resin should be used within a short time, ordinarily within one or two hours.

About 30 to 50 percent by weight chopped glass roving is preferably incorporated in the coating during spraying. Glass fiber roving coated with a hard chrome binder is preferred. This general type of binder is disclosed, for example, in U.S. Pat. Nos. 2,733,183, 2,910,378 and 2,825,659 and coated rovings are available commercially from several sources. This type of chrome binder is believed to improve ductility of the bond between resin and glass, so that vibration and shock do not loosen the glass fibers. Lime-alumina-borosilicate glass or other glass compositions sold as roving for reinforcing epoxy resins may be used.

CURING THE COATING

Obtaining the proper cured condition in the resin coating is important. The coal tar modified epoxy resins may be purchased in a form with viscosity suitable for spray coating and the ability to cure to a hard but not brittle condition. The resistance of these reinforced resins to peak loads under vibration or impact is extraordinary, some compositions being able to flex under stress to a greater degree than an equal thickness of plywood without cracking. Sufficient ductility of the coating in combination with distribution of stresses transmitted through the sandblasted adhesion pattern is believed to be mainly responsible for the exceptional durability of structures reinforced by the method of this invention.

EXAMPLE 1

The following pieces of equipment were reinforced by the method of this invention; the interior of a badly corroded revolving drum drier for ammonium nitrate prills, a sidewall of an ammonium nitrate liquor tank and the corroded roof of the wind tunnel of an ammonium nitrate prilling tower, all of ordinary mild steel construction. A sandblasting pattern of crisscrossed or horizontal lines exposing as bare metal only about 25 percent of the total surface was employed in all three pieces of equipment. The reinforcement of the roof was bonded only at periphery and at about three foot intervals. Glass fiber reinforced coatings varying from about 0.15 inch to 0.25 inch in thickness were applied, depending on the degree of reinforcement required. The resin employed was Porter No. 1332 coal tar epoxy, reinforced with P.P.G. No. 525 roving (60 end) coated with hard chrome binder. No failure of either the coatings or the adhesive bonds was observed on inspection for maintenance purposes. The strength of the reinforced structures was apparently at least equivalent to design strength prior to corrosion and further corrosion appeared to have been effectively prevented. The revolving drum, which had been badly corroded before coating, required no further maintenance, the coating having proved to be as durable on this moving structure under constantly fluctuating loads as on the stationary structures.

EXAMPLE 2

A flexible sheet of mild steel three feet wide and five feet long was prepared for coating by sandblasting a line about 2 inches wide around the perimeter and another line across the width of the sheet in the center. A coating was sprayed on as in example 1, employing about 30 percent by weight chopped glass fiber roving and 60 percent resin. The coating was cured and then the sheet was subjected to a severe accelerated aging test. While the sheet was continuously flexed the environment was repeatedly cycled from exposure to heat lamps, to steam, then to refrigerated air. After 60 days of this treatment the coated sheet was examined. There was no loss of resilience of the coated structure and no evidence of cracking or of failure of the bond between the coating and the steel. The test was conservatively estimated to have been equivalent to three years of service of an industrial structure exposed to vibration and weather.

This method of forming and attaching a ductile reinforced resin coating has been found to reduce maintenance on structures and to contribute substantially to strength, so that it is economical to design new structures using materials of thinner cross section and to apply coatings before putting them into service. The method is particularly adapted to use on metal storage tanks and bins in corrosive environments.

I claim:
1. The method of reinforcing metal structures comprising the following steps:
   a. abrading less than one-third of the surface of the structure to be reinforced in a substantially uniform pattern which extends over the entire surface but exposes less than one-third of the total surface area of the underlying material of construction,
   b. coating the entire surface area to be reinforced with an adhesive thermosetting resin containing discontinuous glass fibers, and
   c. curing the resulting coating of adhesive thermosetting resin and glass fibers to yield a hard, adherent coating which is dimensionally stable but may be deformed substantially without cracking.
2. The method of reinforcing metal structures comprising the following steps:
   a. sandblasting less than one-third of the structure to be reinforced in a pattern of lines which extends over the entire surface but exposes less than one-third of the surface of the underlying material of construction,
   b. spraying the entire surface area to be reinforced with a mixture of thermosetting coal-tar modified epoxy resin and chopped glass fiber roving bearing thereon a hard chrome binder coating, and
   c. curing the resulting coating of resin and glass fibers to yield a hard, adherent coating which is dimensionally stable but may be deformed substantially without cracking.
3. The reinforced metal structure made according to the method of claim 2.

* * * * *